US006765387B2

(12) United States Patent
Prammer

(10) Patent No.: US 6,765,387 B2
(45) Date of Patent: Jul. 20, 2004

(54) SYSTEM AND METHOD FOR MEASURING RESISTIVITY THROUGH CASING

(75) Inventor: Manfred G. Prammer, Downingtown, PA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/326,439

(22) Filed: Dec. 20, 2002

(65) Prior Publication Data

US 2003/0122547 A1 Jul. 3, 2003

Related U.S. Application Data

(60) Provisional application No. 60/343,571, filed on Dec. 20, 2001.

(51) Int. Cl.[7] ............................... G01V 3/20; G01V 3/24
(52) U.S. Cl. ....................................... 324/368; 324/366
(58) Field of Search ........................... 324/366, 368–371

(56) References Cited

U.S. PATENT DOCUMENTS

| 4,820,989 | A | | 4/1989 | Vail, III ..................... 324/368 |
| 5,075,626 | A | | 12/1991 | Vail, III ..................... 324/368 |
| 5,510,712 | A | | 4/1996 | Sezginer et al. ............ 324/368 |
| 5,543,715 | A | * | 8/1996 | Singer et al. ............... 324/368 |
| 5,563,514 | A | | 10/1996 | Moulin ....................... 324/368 |
| 5,608,323 | A | * | 3/1997 | Koelman .................... 324/368 |
| 6,025,721 | A | * | 2/2000 | Vail, III ..................... 324/368 |
| 6,246,240 | B1 | * | 6/2001 | Vail, III ..................... 324/368 |
| 6,351,129 | B1 | * | 2/2002 | Gounot ....................... 324/368 |
| 6,545,477 | B1 | | 4/2003 | Beguin et al. .............. 324/368 |

FOREIGN PATENT DOCUMENTS

WO    WO 00/79307 A1    12/2000    ............ G01V/3/20

OTHER PUBLICATIONS

D. Benimeli, C. Levesque, G. Rouault, I. Dubourg, H. Pehlivan, D. McKeon, O. Faivre, K. Rebolledo, "A New Technique for Faster Resistivity Measurements in Cased Holes," SPWLA 43$^{rd}$ Annual Logging Symposium, Jun. 2–5, 2002.

M. Tchambaz, B. Belhadj, "Reservoir Monitoring with the CHFR in Water Injection Reservoirs, Libya Eamples," SPE 84598, SPE Annual Technical Conference and Exhibition, Denver, Colorado, Oct. 5–8, 2003.

* cited by examiner

Primary Examiner—N. Le
Assistant Examiner—Reena Aurora
(74) Attorney, Agent, or Firm—Jones Day

(57) ABSTRACT

The present invention is a system and method capable of providing continuous measurements of resistivity-through-casing (RTC) of a geological formation traversed by a boreholeby eliminating measurement of the casing resistance. To this end, a real-time feedback control substantially eliminates current flow along the casing in the vicinity of an injection point for injecting a measuring current into the formation. This allows direct estimation of the measuring current injected into the formation along with the casing voltage used to drive the current into the formation. As a result, there is no need for "nulling" or calibration cycle that requires two step measurements with the RTC tool held stationary. The preferred feedback is by the proportional integral derivative procedure (PID) with a digital signal processor that controls bi-directional steerable current sources supplying one or more current to the casing at various points.

40 Claims, 4 Drawing Sheets

SYSTEM AND METHOD FOR MEASURING RESISTIVITY THROUGH CASING

REFERENCE TO RELATED APPLICATIONS

This application claims the benefit under U.S.C. §119 of the U.S. Provisional Application No. 60/343,571 filed on Dec. 20, 2001, which is incorporated herein in its entirety by reference.

FIELD OF THE INVENTION

This invention relates to a system and method for logging geological formation traversed by a borehole and more particularly to measuring formation resistivity through a cased borehole, wherein resistivity measurement is performed in a continuous, non-stop fashion.

BACKGROUND OF THE INVENTION

Measurement of the formation resistivity has been a well-known method to determine presence of hydrocarbons in a formation traversed by boreholes. Typically, however, a borehole is cased shortly after drilling to provide structural integrity of the well. Consequently, the technique of resistivity-through-casing (RTC) was developed to measure the formation resistivity from within the cased well. A general problem of formation RTC measurements is the high electromagnetic attenuation due to the high conductivity of the casing material, since such material is typically a single-wall mild-steel pipe with a conductivity of the order of $10^6$ S/m (resistivity is about $10^{-6}$ Ωm). Galvanic RTC measurements provide one method capable of overcoming this problem due to electromagnetic attenuation.

There are several galvanic measurement methods, all of which have a common measurement principle: a known current is injected downhole into the casing and is returned through a surface electrode far from the wellhead. The casing leaks current into the formation, and the corresponding loss of current, being proportional to the local formation conductivity, can be determined by comparing the voltage drop across adjacent sections of the casing.

Important parameters of the galvanic method include, for example the characteristic length $\lambda_L$, which determines on what length scale most of the current has leaked into the formation. This parameter is approximately given by $$\sqrt{\frac{\rho}{R}},$$

where $\rho$ is the average (global) formation resistivity and R is the casing resistance per meter. For typical values of $\rho=10$ Ωm and R=40 $\mu$Ω/m, the characterisitic length $\lambda_L \approx 500$ m. The characteristic impedance Q, is yet another important parameter, given by $Q=R\lambda_L/2$. Q also is equal to the potential developed at the injection point for a current of 1A. For example, R=40 $\mu$Ω/m and $\lambda_L \approx 500$ m, then Q=10 mΩ; that is a current of 10A develops a voltage drop $V_0$ of 100 mV between the injection point and a (infinitely) remote return electrode.

Generally, galvanic RTC measurement is performed in the following fashion. A current (typically $I_0=10$A) is injected into the casing; this current splits evenly in all directions. Close to the injection point, assuming a local formation resistivity of $\rho=10$ Ωm, the pipe leaks current at a rate of $dI=I_0/2/\lambda_L=10$ mA/m. This loss of current is proportional to the local formation conductivity and can be determined by comparing the voltage drop across adjacent sections of the pipe. Over the first 1 m section, for example, a voltage drop of 5A×40 $\mu$Ω/m×1 m=200 $\mu$V can be measured. The next 1 m section sees 4.99A×40$\mu$Ω/m×1 m=199.6 $\mu$V, the difference being 400 nV. Assuming that the exact casing resistance in both the intervals is known, one can determine the leakage current $\Delta I$ over an interval $\Delta z=1$ m. The apparent local formation resistivity reading is approximately $\rho_a=k\Delta z V_0/\Delta I$, where k is a geometric parameter on the order of 1, which depends weakly on the average formation resistivity, the casing resistance and the casing radius.

The problem with this method is that the resistance of the casing is variable. In order to resolve 100 Ωm in $\rho_a$, one needs to be accurate down to at least 40 nV in the difference voltage. With 5A passing through the casing, 40 nV are added or subtracted by a change of 8 nΩ or 0.02%. The pipe is typically corroded and its diameter and resistance vary much more than that. As a result, the measurement of the resistivity must be done in a stop-and-go fashion. At every station the tool has to initially stop to determine the resistivity of casing, then it can determine the resistivity of the formation, and finally it can move to the next station.

Stop-and-go RTC measurement methods have been implemented in a tool developed by Baker-Atlas, a division of Baker Hughes Inc. Various realizations of the Baker-Atlas tool have been adapted in the industry. The underlining measurement principle of stop-and-go RTC tools is typically that shown in FIG. 1. A known current $I_0$ is passed along the casing from an electrode A to an electrode B (the remote electrode at the surface). $I_0$ is typically in the range of 5 to 10 amperes. The current has to leave the casing and traverse the formation in order to arrive at the surface electrode B. One-half of this current flows past the electrodes C, D, and E. These electrodes and the connected differential amplifiers register the voltage drop due to the casing resistance. If no formation current is present, the voltage drops C–D and D–E are equal, assuming equal pipe resistance in the intervals C–D and D–E. Current leakage, i.e., formation conductivity, is indicated by an imbalance between the voltage drops, which result in a net difference voltage $V_{out}$.

In practice, the pipe resistivities are unbalanced and a nulling cycle, shown in FIG. 2, is required to determine the pipe resistivity at the measurement point and to compensate for any offset voltages and gain differences in the amplifiers. During nulling, the current $I_0$ is passed between electrodes A and F, a mode in which very little formation leakage occurs. The gain of one differential amplifier is adjusted until $V_{out}$ becomes zero. This nulling operation is done at every new station. Once $V_{out}$, has been nulled, the tool must not move before the measurement mode, shown in FIG. 1, is completed. This in turn necessitates a stop-and-go operation between measurements.

In addition, the Baker-Atlas type tools generally exhibit strong boundary effects in the presence of inhomogeneities that approach the length scale $\lambda_L$. Under these conditions, the injected current no longer splits up evenly and the current portion that flows under the sensing electrodes C, D, E becomes unknown. For example, approaching an oil-water contact, the injected current would preferably flow into the direction of the water. Depending on the orientation of the tool, this increases or decreases the sensed voltage differences, causing a gross misreading of the local resistivity due to distant changes in large-scale conductivity.

Some of the shortcomings of the Baker-Atlas design have been recognized in the U.S. Pat. No. 5,075,626 to Vail (the "Vail patent"). The Vail patent proposes to use two different frequencies: a lower one for the current traversing the formation and a higher one to only sense the casing resistance. The problem is that these two currents penetrate the casing to different skin depths (due to difference in frequencies) and experience different resistance.

Another problem of the Baker-Atlas design—supplying a large current over the wireline—is addressed in the U.S. Pat. No. 5,510,712 to Sezginer ("Sezginer"). In accordance with Sezginer, the RTC tool may optionally be powered efficiently to replace the surface based current supply with current sources in the tool. Sezginer eliminates the use of surface electrodes by deploying two opposing current loops, each extending over about 10 m of the casing. Between the two current loops, several voltage electrodes monitor the voltage drop due to current leakage into formation. This approach requires that, the tool be very long (at least 22 m). In addition, the sensed voltages are smaller by two orders of magnitude than in the tool-to-surface configuration because most of the current simply circulates on the casing and does not contribute to the measurement.

An alternative solution is proposed in U.S. Pat. No. 5,563,514 to Moulin, in which a Wheatstone Bridge is used as a sensing element. One leg of the bridge is formed by two sections of the casing, contacted by three voltage-sensing electrodes, and the other leg is realized by a "potentiometer"-type circuit. In the first of two steps, a current is passed only along the casing and the potentiometer circuit adjusted to eliminate the net bridge voltage. Then, in a second step, during the actual measurement, a current is passed from the tool to the surface. The bridge becomes unbalanced. Balance is restored by injecting an additional current at a center electrode in proportion to the error voltage sensed by the bridge amplifier. The design is difficult to realize in practice since the voltages involved are very small to begin with and must be divided with great precision.

The above-described RTC tools require a stop-and-go logging process. In particular, at every measurement station the tool has to initially stop to perform a nulling cycle, which compensates for changes in casing resistivity, followed by determination of the resistivity of the formation. In other words single resistivity measurement requires at least two steps. Moreover, the tool exhibits strong boundary effects in the presence of inhomogeneities that approach the length scale $\lambda_L$. Under these conditions, the injected current no longer splits up evenly, and the current portion that flows under the sensing electrodes becomes unknown. For example, approaching an oil-water contact, the injected current would preferably flow into the direction of the water. Depending on the orientation of the tool, this increases or decreases the sensed local voltage differences, causing gross misreading of the local resistivity due to distant changes in large-scale conductivity.

Accordingly, it is one object of the present invention to provide a logging tool that directly measures formation resistivity through a cased borehole without preliminary computation of casing resistivity. It is another object of the present invention to provide method for RTC logging that enables direct measurement of formation resistivity by compensating, in a simple and effective manner, for variations in the casing resistivity. It is another object of the present invention to provide a RTC tool and method for continuous, non-stop resistivity logging in which the nulling cycle is eliminated so that the formation resistivity is measured directly. Yet it is another object of the present invention is to provide a RTC tool that is unaffected by the strong boundary conditions that may exist in the presence of heterogeneous formations.

SUMMARY OF THE INVENTION

The disclosed invention comprises methods and systems for continuous estimation of the formation resistivity through the casing of a borehole by eliminating the need to estimate the actual casing resistance by providing a real-time feedback control to eliminate current flow along the, usually, conductive casing in the vicinity of an injection point for the injection of a measuring current into the formation. This allows a direct estimation of the current injected into the formation along with the casing voltage used to drive the current into the formation. The preferred method for generating the feedback is to use the proportional integral derivative procedure to correct for both offsets and overcompensation. Preferably a digital signal processor generates the feedback and uses it to control bi-directional steerable current sources supplying one or more currents to the casing at various points. However, the illustrative preferred embodiment is not intended to limit the scope of the invention, and instead provides a workable example of the general principles. Thus, the following disclosure also teaches principles for the design of continuous formation resistivity measuring equipment and procedures in cased boreholes and similar challenging environments.

In contrast to the above-described RTC tools, the RTC tool in accordance with a preferred embodiment of the present invention is capable of directly measuring the resistivity of a formation traversed by a cased borehole without a prior nulling cycle in which changes to the casing resistivity are compensated for. To this end, the RTC tool of the present invention enables optional non-stop measurement of the formation resistivity at various measurement stations. Accordingly, resistivity measurements can be taken with a moving RTC tool to efficiently generate a moving RTC log.

The disclosed system and method may operate in a region of the borehole casing from which a measuring current is injected into the formation. This current may be measured directly along with the voltage of the casing at the point or region of injection. Current flow along the casing is reduced to within acceptable error in estimated formation resistivity by using one or more balancing or additional current sources that are adjusted in real-time to substantially eliminate current flow along the casing that may affect the estimation or injection of measuring current into the formation. As is apparent several measuring and balancing current sources may be used, although the preferred embodiment uses only two balancing and one measuring current sources. In the preferred embodiment, these current sources are arranged symmetrically about the measuring current injection electrode. In addition, there are measuring electrode pairs deployed in the regions where no current flow along the casing is desired to provide a sensor for detecting and correcting any such current flow.

The system and method of the present invention include improvements to the prior art stop-and-go mechanism for RTC measurement. For instance, the RTC measurement in accordance with the present invention does not require determination of the casing resistivity. Therefore, there is no need for "nulling" or calibration cycle so that the measurement of formation resistivity at various stations can be done in a continuous fashion. Consequently, RTC measurement can be done with a moving tool that is a foundation for a moving RTC log.

In one aspect of the invention, a system for measuring formation resistivity comprises at least two instrumental amplifiers, at least two analog-to-digital (A/D) converters, at least one digital signal processor (DSP) and plurality of bi-directional, steerable current sources regulated by the DSP.

In another aspect of the invention, a method for measuring formation resistivity comprises steps of injecting first, second and third currents, monitoring voltage drop across two regions formed between the injection points, and adjusting the first, second and third currents as to eliminate potential difference between the first and second regions.

In yet another aspect of the invention a preferred algorithm for operation of the DSP is disclosed, in particular for providing real-time feedback to the current sources. The algorithm, based on the proportional integral derivative (PID) procedures, not only corrects in proportion to the error, i.e., voltages due to current flow along the casing about the injection of the measuring point, it also provides a correction for removing offset by using cumulative corrections (the integral contribution) and the trend of the correction (the derivative contribution) to provide a robust real-time feedback. It should be noted that the DSP is intended to not only encompass hardwired signal processors, but also programmable and configurable processors to provide a tuned response suitable for various conditions and specifications.

The DSP performs the essential real-time control and signal processing activities. First, the DSP performs phase-coherent detection of the operating frequency on all input signals. Then, it conducts time-domain averaging of the received signals to increase their signal-to-noise ratio (SNR). Next, it detects any imbalance between the two voltage signals. In case any imbalance is detected, the DSP equalizes the potential differences in the region between the voltage-sensing electrodes by regulating via bi-directional, steerable current sources the amount of current injected through the current-injecting electrodes. In particular, the DSP performs PID and PWM algorithms that respectively compute amount of injected current needed to reach equilibrium and corresponding ON/OFF conditions for the current sources.

Additional aspects of the invention are described in further detail below.

BRIEF DESCRIPTION OF THE DRAWINGS

The advantages of the present invention will become apparent from the following description of the accompanying drawings. It is to be understood that drawings are to be used for the purpose of illustration only, and not as a definition of the invention.

DETAILED DESCRIPTION OF THE INVENTION

The disclosed invention comprises methods and systems for continuous estimation of formation resistivity in a cased borehole by eliminating the need to estimate the actual casing resistance by providing real-time feedback controls to eliminate current flow along the, usually, conductive casing in the vicinity of an injection point for the injection of a measuring current into the formation. This allows direct estimation of the current injected into the formation along with the casing voltage used to drive the current into the formation. The preferred method for generating the feedback is to use the proportional integral derivative procedure to correct for both offsets and overcompensation. Preferably a digital signal processor generates the feedback and uses it to control bi-directional steerable current sources supplying one or more current to the casing at various points. However, the illustrative preferred embodiment is not intended to limit the scope of the invention, and instead provides a working example of the underlying general principles. Thus, the following disclosure also teaches the design of continuous formation resistivity measuring equipment and procedures in cased boreholes and similar harsh environments.

Figure 1:
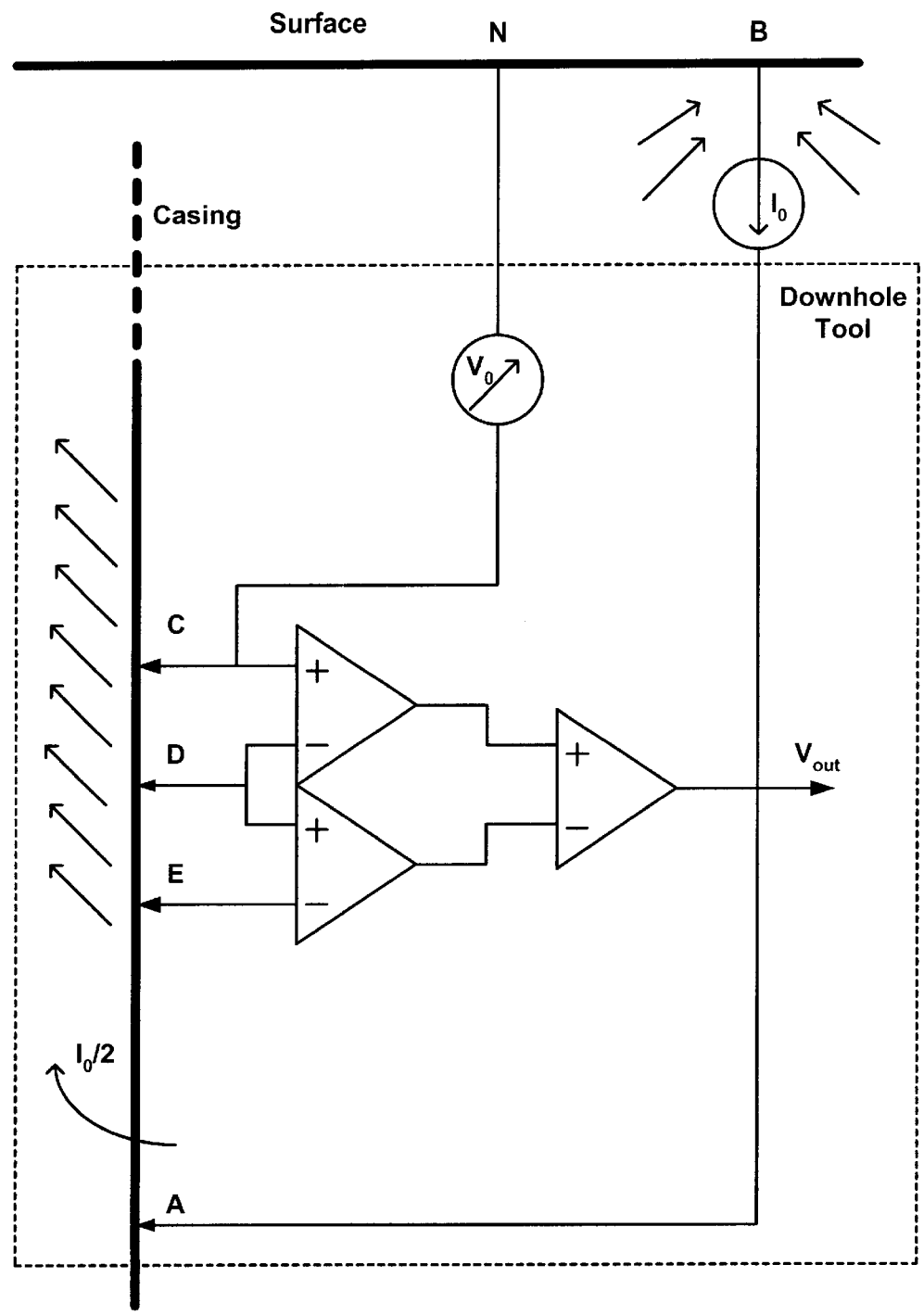
FIG. 1 shows a schematic diagram of the Baker-Atlas RTC tool in measurement mode.
Figure 2:
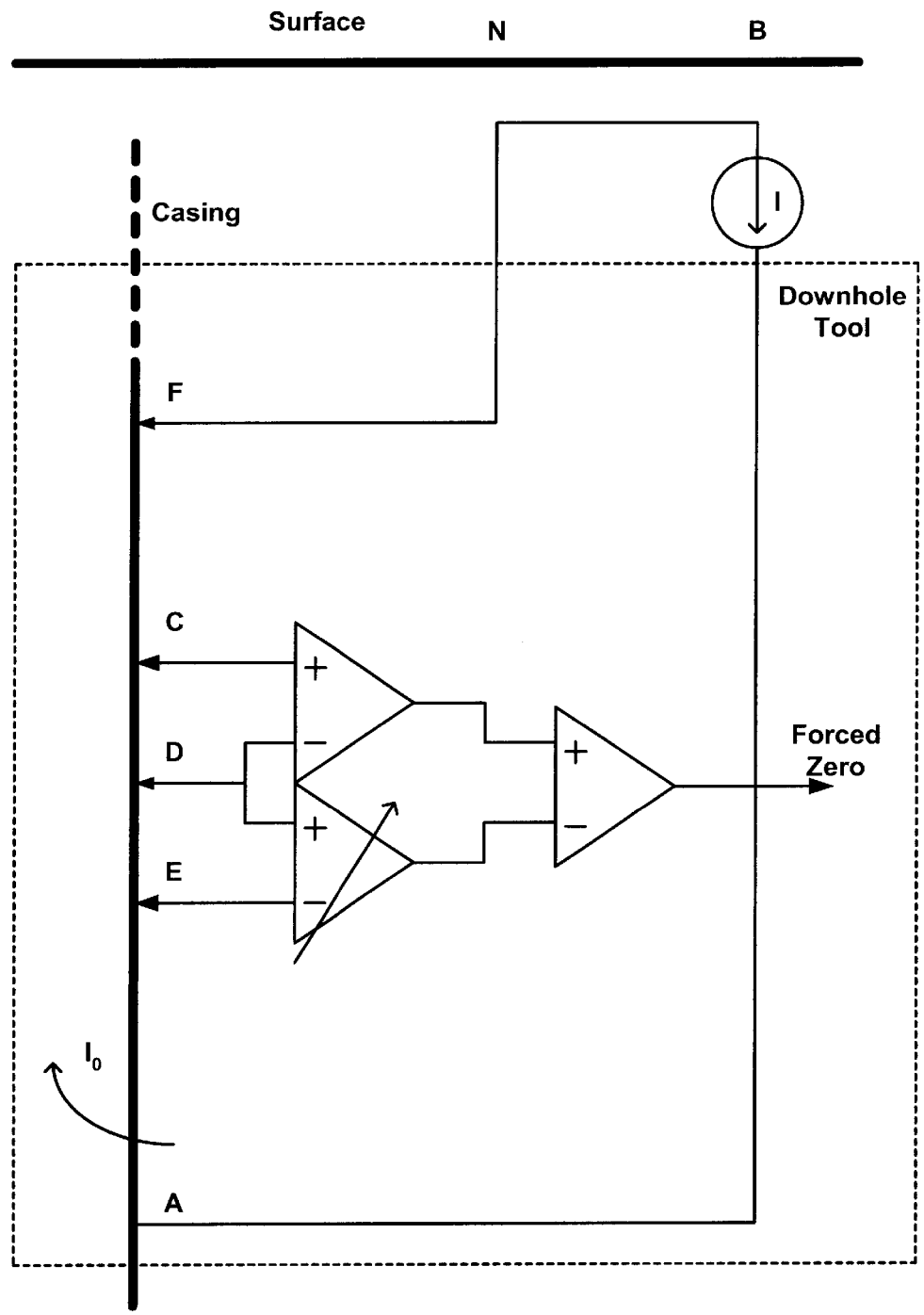
FIG. 2 shows a schematic diagram of the Baker-Atlas RTC tool in nulling mode.
Figure 3:
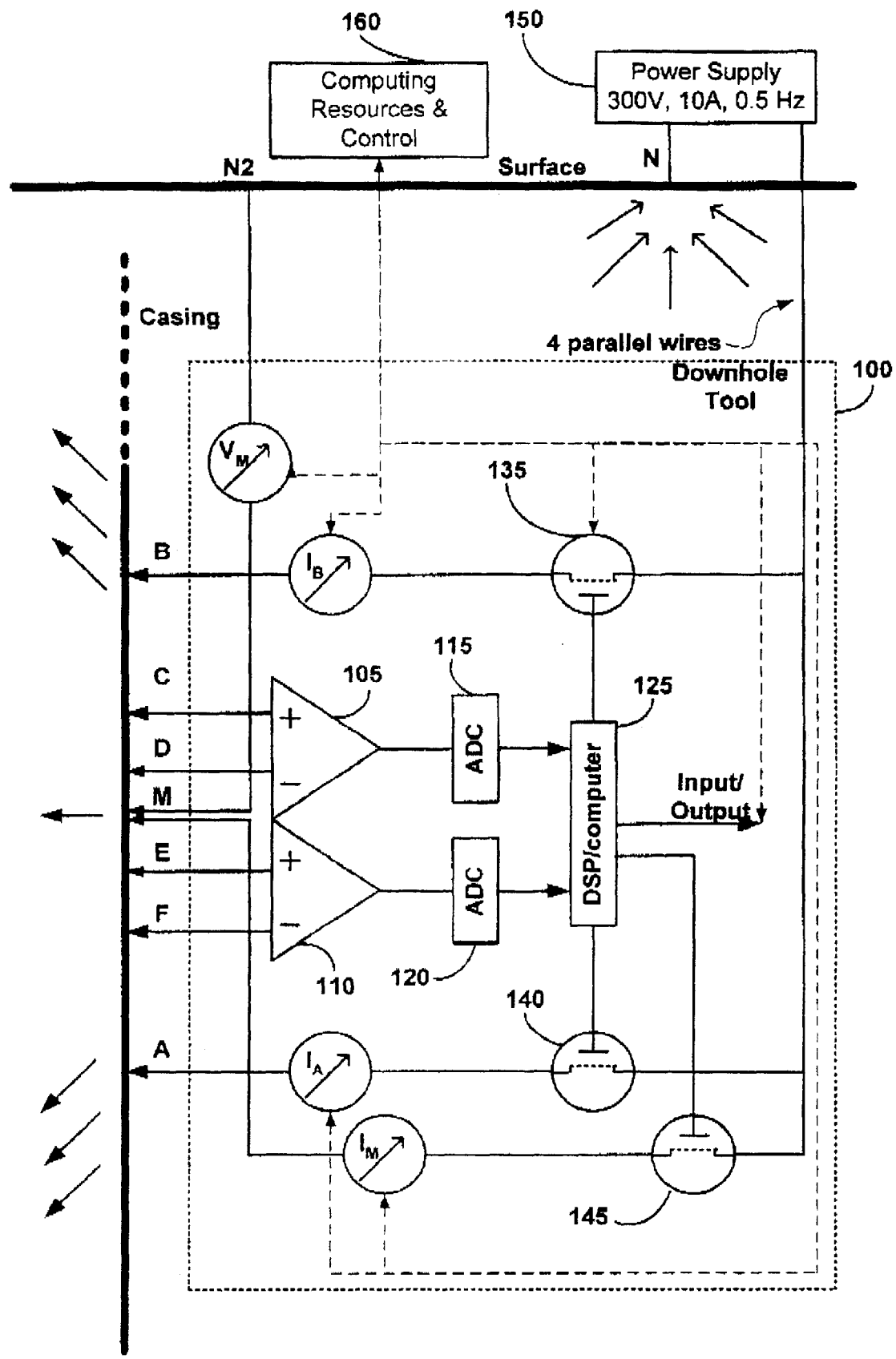
FIG. 3 shows a schematic diagram of the RTC tool according to the preferred embodiment of the present invention.

A preferred embodiment of the system of the present invention is shown in FIG. 3. The downhole tool 100 comprises amplifiers 105 and 110, analog-to-digital (A/D) converters 115 and 120, a digital signal processor (DSP) 125 and bi-directional, steerable current sources 135, 140 and 145, and plurality of electrodes.

The system operates in the following fashion. Uphole Power Supply 150 provides current $I_0$ to downhole tool 100, which is lowered into the borehole on the wireline. Current $I_0$ is transmitted to tool 100 through four parallel wires, typically, on a 7-wire cable. $I_0$ is an alternating current (AC) at a low frequency, preferably in a range of 0.1 Hz to 1 Hz. Generally, 10A of current results in a 250V voltage drop on the wireline. Moreover, power supply 150 is capable of delivering up to 300V and 3,000W to tool 100. Due to improved SNR with filtering, it is preferred that a time-varying current be employed. Filtering, in effect provides a correlation between the injected current and the formation resistance measured therefrom. Wireline may also transmit telemetry data between the surface power and tool 100.

The frequency of current $I_0$ is chosen in a range that will reduce adverse electrical effects such as induced polarization phenomena, errors due to movement of the measurement device through the casing, and the "skin" effect along the casing wall. For conventional steel, the skin effect begins to manifest itself significantly at signal frequencies greater than about 10 Hz.

Downhole, the current 10 splits into currents $I_A$, $I_B$, and $I_M$, so that $I_0 = I_A + I_B + I_M$. Preferably, $I_M$ is a much smaller current—up to a few 100 mA—than either $I_A$ or $I_B$. The tool comes into a contact with the borehole casing and currents injected into the casing at electrodes A, B, and M, and are returned at the remote surface electrode N. Electrodes A and B are preferably about 4 meters apart, and electrode M is at a midpoint between them. DSP 125 controls currents $I_A$, $I_B$, and $I_M$ through current regulators that can be simple, high-current, bi-directional MOSFET switches shown in FIG. 3 as identified by numerals 135, 140 and 145.

Four measurement electrodes C, D, E and F are positioned in the preferred embodiment in the regions between the three injection electrodes, so that electrodes C and D are between points B and M and electrodes E and F are between points M and A. The measurement electrodes sense the potential difference across two adjacent sections of the casing formed between injections electrodes A, B and M.

Two instrumentation amplifiers 105 and 110 connected to the measurement electrodes provide differential amplification of the voltages across electrodes C–D and E–F respectively. Each amplifier produces an analog signal on its output terminal that represents potential difference across pair of electrodes. Amplifiers 105 and 110 may have offset voltages in the range of +/−10 $\mu$V; to eliminate its influence, the measurement must be of the A.C. type. The skin depth of the casing at 1 Hz is about 1 cm (assuming mild steel with $\mu r=1000$); therefore an operating frequency of the amplifiers is limited to about 10 Hz. The gain of the amplifiers should not exceed $10^5$. In this case, the offset voltage range translates into maximally −1V to +1V at the input of A/D converters 115 and 120.

Analog-to-digital converters 115 and 120 convert analog signals produced by amplifiers 105 and 110 into digital signals for further processing by DSP 125. Analog-to-digital converters 115 and 120 preferably are sigma-delta converters, which can easily resolve 16 bits at frequency between 0.1 Hz and 10 Hz with very high linearity. Such converters are manufactured, for example, by Analog Devices Inc. of Norwood, Mass.

Digital Signal Processor 125 performs the essential control and signal processing activities. More particularly, DSP 125 (1) determines presence of potential difference across electrodes C–D and E–F, and (2) adjusts currents $I_A$, $I_B$, and $I_M$ to keep the voltage C–D and E–F at about zero. If DSP 125 detects a common-mode voltage drop of the $V_C > V_D$ and $V_E < V_F$, the injection current $I_M$ is increased. A differential-mode imbalance of the type $V_C > V_D$ and $V_E > V_F$, causes less current to be injected into electrode A and more into electrode B, and, finally, for $V_C < V_D$ and $V_E < V_F$, more current is steered to electrode A and less to electrode B.

DSP 125 preferably runs at 10 million instructions per second. Assuming that the algorithm takes 1,000 instructions, then one complete regulation loop is completed in 100 µs. One regulation loop is preferably repeated 10,000 times per second, which translates to 10,000 adjustment steps per half-cycle of a 0.5 Hz waveform, for example.

Following is a general outline of the control loop for DSP 125 in a preferred embodiment.

Sample all analog/digital converters and prepare for the next sample/hold/conversion cycle (every 100 µs).

Perform phase-coherent detection of the operating frequency on all input waveforms. This is done over multiples of full waveforms, which removes all DC components (mostly from amplifier offset voltages).

Average all readings over several seconds to decrease the noise bandwidth to fractions of 1 Hz.

Add currents $I_A$ and $I_B$. If the sum is less than 10A, increase the targets for both currents; if more than 10A, reduce the targets for both currents.

Detect imbalances between the two error voltages C–D and B–F. If |C–D|>|E–F|, increase current $I_A$ and reduce current $I_B$. On the other hand, if |C–D|>|E–F|, then reduce current $I_A$ and increase current $I_B$.

Detect error voltages common to C–D and E–F. If the voltages indicate a common-mode current flowing towards electrode M, then increase the injection current at M. If there are common-mode currents flowing away from M, reduce the current into M.

Add all corrective increments and decrements resulting from steps (4), (5) and (6) and compute net error values.

Perform a proportional-integral-derivative (PID) algorithm for currents $I_A$, $I_B$, and $I_M$ to compute correction increments or decrements. The PID algorithm is a feedback controller successfully deployed for over 50 years. It is a robust easily understood algorithm that can provide excellent control performance despite the varied dynamic characteristics. PID essentially is a procedure that provides correction for offsets based on the integral, and for overshoots based on the derivative of the sensed error signal in addition to the magnitude of the sensed error signal. Thus, PID input includes the error signal(s) from previous time points. The PID algorithm consists of three basic modes, the Proportional mode, the Integral and the Derivative modes. When utilising this algorithm it is necessary to select one or more of these modes and then specify the parameters (or settings) for each selected mode. These parameters may be changed (tuned) to obtain a desired response. Typically, three basic algorithms, P, PI or PID, are employed.

The mathematical representation for the proportional algorithm is, $$\frac{mv(s)}{e(s)} = k_c$$

in the Laplace domain or $mv(t) = mv_{ss} + k_c e(t)$ in the time domain. The proportional mode adjusts the output signal in direct proportion to the error signal, "e". The adjustable parameter for tuning the response is the controller gain, $k_c$. The time domain expression also indicates the need for calibration around the steady-state operating point, which in the present case is a constant voltage difference of 0.0 V to reduce the flow of current along the casing. This is indicated by the constant term $mv_{ss}$, which represents the 'steady-state' voltage signal for mv and is used to ensure that at zero error mv is at the specified setpoint.

It should be noted that the specification of 0.0 volts in the preferred embodiment is illustrative and not limiting since a non-zero voltage specification, in effect, requires a current flow, or a specified tolerance for an error in the formation resistivity estimates. Similarly, although voltage measurements are preferred for detecting current flow along the casing, alternative sensors, such as those directly sensitive to current, may be employed with no loss of generality to provide an error signal to the DSP. Notably, a proportional controller typically reduces error without eliminating it, thus making the mere provision of such a servo mechanism insufficient to provide adequate real-time feedback unless, of course, the process has naturally integrating properties. Thus, normally an offset between the actual and desired value will exist with just the proportional algorithm, which implies that the current along the casing will not be reduced to zero. Non-zero currents leaking into the formation from the balancing current sources directly result in errors in the formation resistivity estimates since the current through the measuring electrode(s) will be an underestimate (or an overestimate) of the actual current injected into the formation.

The mathematical representation for the proportional integral algorithm is similar:

$$\frac{mv(s)}{e(s)} = k_c \left[ 1 + \frac{1}{T_i s} \right]$$

in the Laplace domain and $$mv(t) = mv_{ss} + k_c \left[ e(t) + \frac{1}{T_i} \int e(t) dt \right]$$

in the time domain. The additional integral mode (referred to as reset) corrects for any offset errors that may occur between the desired and actual output automatically over time. Reset is the time it takes for the integral action to produce the same change in mv as the produced by the previously described P (or proportional) mode. When an error signal is received for significant periods of time, the integral term increases at a rate governed by the time over which such errors are summed (integrated). Thus, for instance, the parameter $T_i$ and the integration time may be adjusted to control the rate and extent of integral sensitive feedback.

One form of the PID algorithm with derivative based feedback added is given by:

$$\frac{mv(s)}{e(s)} = k_c \left[ 1 + \frac{1}{T_i s} + T_D s \right]$$

in the Laplace domain, and $$mv(t) = mv_{ss} + k_c \left[ e(t) + \frac{1}{T_i} \int e(t)dt + T_D \frac{de(t)}{dt} \right]$$

in the time domain. Derivative action tends to anticipate where the various changes are heading by looking at the time rate of change of the error. However, its effect is compromised by the presence of excessive noise, which results in excessive changes that contribute to reduced stability. A suitable choice of $T_D$, the "rate time," can tune the derivative response along with a suitable scale over which the error signal is received. In addition, it is preferable to average out or, even filter, the noise.

In addition to the above distinctions, there are three major classifications of the full PID algorithms: ideal, series, and parallel. The previously described expression corresponds to the ideal version. In the series version, in the Laplace domain, a representative expression is $$\frac{mv(s)}{e(s)} = k_c \left[ 1 + \frac{1}{T_i s} \right] T_D s,$$

while the parallel version is given by:

$$\frac{mv(s)}{e(s)} = k_c + \frac{1}{T_i s} + T_D s$$

so that only the proportional gain, $k_c$, acts on the error signal, with the integral and derivative corrections provided independently. As may be seen, the specification of the PID algorithm in the preferred embodiment is not limiting, and instead it provides an example of a suitable feed-back scheme with time averaged error voltage signals providing sufficiently low noise to allow stable operations in a cased wellbore. The extent of corrective action, i.e., changes in one or more of currents $I_A$, $I_B$, and $I_M$, may be 'filtered' by specifying upper and/or lower limits to enhance stability. Moreover, tuning by selection of suitable values for $k_c$, $T_i$ and $T_D$, if a strict PID algorithm is being used, a desired performance of the control circuit may be obtained.

Thus DSP 125 receives error signals in the form of the digitized voltages from ADC 115 and 120, and is configured to adjust the various currents to reduce the error to about zero in real-time.

Then, DSP 125 runs pulse width modulation (PWM) algorithm for current switches feeding A, B, and M. The results of the algorithm determines the length of time for which the switches need to be closed to supply necessary amount of current to the electrodes A, B, and M and maintain the desired equilibrium. As a result, DSP 125 computes ON-or-OFF conditions for switches for the next 100 μs time slot. The currents are adjusted in steps of 1/10,000 increments by pulse width modulation, which corresponds to 1 adjustment per 1 control loop of the DSP.

Translate the measured currents $I_A$, $I_B$, and $I_M$, into output readings.

Translate the measured voltages $V_M$ into an output reading.

Transmit updated output readings, system status and error conditions.

Wait to complete 100 μs and repeat from the start.

Many, or even all of these steps may be controlled by Computing Resources & Control 160, preferably located at the surface. Computing Resources & Control 160 may aid in tuning DSP 125, compute the average and apparent formation resistivities, and receive measurements of $I_A$, $I_B$, $I_M$, $V_O$, $V_M$ and the like. The communication between Computing Resources & Control 160 and downhole components and instruments could be by way of any means such as wireline, radio, portable modules, or even stored data that is completely or partially processed in situ. Similarly, alternative timescales and the like, more accurate and stable detection of the error voltages to reduce Signal to Noise Ratio (SNR), are possible in alternative embodiments of the invention. One set of equilibrium (or set point) conditions for the disclosed preferred embodiment are described next. At regular equilibrium, which is realized by DSP 125, the following conditions exist:

$I_A + I_B = 10A$, $I_A + I_B + I_M = 10$, $V_A = V_B = V_C = V_D = V_M = V_E = V_F = V_0$, $V_O = Q \times I_O$, $V_M = Q_M \times I_M$, where $Q_M$ is directly related to the apparent resistivity at the measurement point M.

The above design provides the following advantages over prior art RTC measurement systems: (1) since there is no voltage across C–D and E–F, the exact resistance between C and D and E and F is irrelevant. A lower limit is only given by the system's sensitivity. (2) The current injected into M under suitable equilibrium conditions passes straight through the casing into the formation and returns to N. Thus, current $I_M$ measured directly provides, along with the voltage $V_M$ at the contact M, provides the necessary almost instantaneous information for continuous estimation of formation resistivity. The contact at M can be realized as a combination of a current injection and a voltage sensing electrodes in close proximity to each other.

Moreover, the simultaneous measurement of $V_M$, $I_M$, $I_A$, and $I_B$ allows calculation of the local formation resistivity $\rho_a$ US follows: characteristic impedance, $Q = V_0/I_0$, average formation resistivity, $\rho = (2Q)^2/R$, approximate apparent formation resistivity, $\rho_a = k \cdot \Delta z \cdot V_0/I_m$. $\Delta z$ is the spacing between electrodes D and E, e.g. 1 m. Typical values are $V_0 = 100$ mV and $Q = 10$ mΩ. The injection current $I_M$ varies between 100 mA for $\rho_a = 1$ Ωm to 1 mA for $\rho_a = 100$ Ωm. Practical distances are mm each for the sections C–D, D–E and E–F. The distances A–F and B–C are not critical (around 50 cm). In order to resolve $\rho_a = 100$ Ωm, no more than 0.5 mA or 0.1% can leak from electrodes A or B into the zero-current zones A–B and C–D. At $R = 40\mu$Ωm, instrumentation amplifiers 105 and 110 must be able to detect voltages as low as 20 nV and the system loop gain must be high enough to regulate out such an error.

In contrast to the Baker Atlas type tools, the disclosed tool design is unaffected by strong boundary conditions in the presence of inhomogeneities that approach the length scale $\lambda_L$. Under these conditions, the injected current no longer splits up evenly and the current portion that flows under the sensing electrodes C, D, E becomes unknown. For example, approaching an oil-water contact, the injected current would preferably flow into the direction of the water. Depending on the orientation of the tool, this increases or decreases the sensed voltage differences, causing gross misreading of the local resistivity due to distant changes in large-scale conductivity. Since the new tool is entirely symmetric, large-scale differences in formation conductivity are balanced out by a redistribution of the injected currents $I_A$ and $I_B$. In the extreme limit, almost the entire 10A flows through only just one electrode. The tool potential $V_0$ is raised and the measurement current $I_M$ increases proportionally without affecting the accuracy of the estimated $\rho_a$.

Furthermore, although the preferred embodiment of new tool is entirely symmetric, this feature is not intended to be a limitation on the scope of the invention. Even in the symmetric case, the above analysis shows that large scale differences in formation conductivity are balanced out by a redistribution of the injected currents $I_A$ and $I_B$. In the extreme limit, the entire 10A flows through only one electrode. The tool potential $V_0$ is raised and the measurement current $I_M$ increases proportionally. The accuracy in $\rho_a$ is unaffected. Although, the magnitude of the current in the preferred embodiment is 10A, this is not a requirement and currents of the order of 1A or greater may easily be used in alternative embodiments. Even lower currents are not intended to the ruled outside the scope of the invention since with superior electronics and noise reducing techniques, lower currents may be used as well.

The above discussion also indicates that asymmetric implementations of the electrode placement are possible with different feedback tuning choices. In effect the electrodes injecting currents to either side of point M are blocking flow of current to or from point M along the casing. Their placement relative to M need not be symmetric in every case. In addition, several electrodes for injecting defined amount of current into the formation, in a manner similar to that for injecting $I_M$, are possible with more complex feedback schemes to provide multiple simultaneous apparent formation resistivity readings at different vertical positions. In another aspect, the error readings from multiple electrodes may be combined to further increase the SNR in addition to averaging over time.

Figure 4:
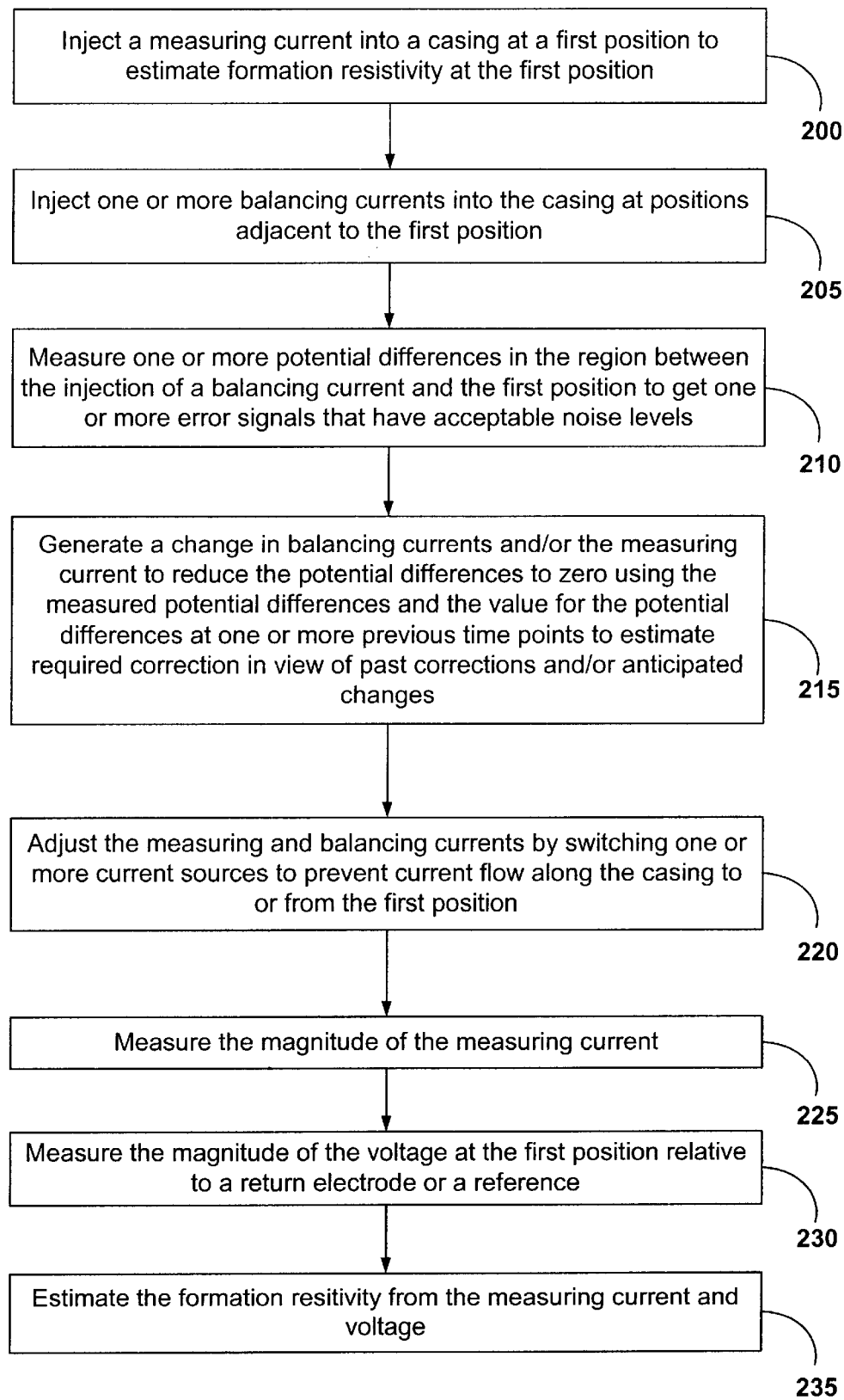
FIG. 4 shows a schematic representation of a method for designing procedures and systems for or actually estimating the formation resistivity in accordance with the present invention.

FIG. 4 shows an exemplary method for either measuring formation resistivity or designing systems and procedures for measuring formation resistivity in accordance with the present invention. The illustrative steps need not be carried out in the disclosed illustrative order. During step 200 a first position is selected for the injection of a measuring current into the formation via the casing. This position may be selected by either positioning a sonde or other wise placing one or more suitable electrodes. Next, during step 205, one or more balancing currents are injected into the casing adjacent to, but at a different position than the first position. During step 210, means for detecting a potential difference (and/or current) along the casing are used to obtain one or more error signals. Typically, a non-zero value for the error signal indicates that there is current flow along the casing to or from the first position. Sophisticated current sensors, e.g., by detecting generated magnetic fields, may be also be used in some embodiments, although this is not typically practical in the harsh borehole environment. A digital signal processing means that responds to the error signals, preferably from several time points, during step 215, to generate a change in the various balancing and measuring currents to drive the error signals to zero.

The output of a digital signal processor, preferably programmable for allowing re-tuning or reconfiguration for different applications, is advantageously used to directly modulate current sources providing the various balancing and measuring currents during step 220. One preferred strategy is to use Pulse Width Modulation (PWM) with bi-directional steerable current supplies to change the current to substantially eliminate current flow to or from the first point. This ensures that the current injected into the formation at or around the first point is the substantially the same as that injected into the first point in the casing under regulated conditions. Thus, this current can be measured directly during step 225. Similarly, the voltage driving the measuring current into the formation is measured during step 230 using suitable voltage measuring means. This information is combined with additional information about electrode placement, various relatively fixed parameters to estimate, during step 235, the apparent formation resistivity at the position of the first point in the formation. A familiar formula was presented earlier as $\rho_a = k \cdot \Delta z - V_0/I_M$, where $V_0$ is the measuring voltage, IM is the measuring current, k is a form factor, and $\Delta z$ is the vertical resolution. As previously mentioned, the resolution for the first position is often the distance between two electrodes for detecting error voltages on either side of the first position. However, other measures may be substituted to provide alternative estimates of the distance along the casing over which the measuring current is injected into the formation.

The foregoing description of the preferred embodiments of the present invention has been presented for purposes of illustration. It is not intended to be exhaustive nor to limit the invention to the precise form disclosed. Many modifications and variations will be apparent to those skilled in the art. The embodiments were chosen and described in order to explain the principles of the invention and its practical applications, thereby enabling others skilled in the art to understand the invention. Various embodiments and modifications that are suited to a particular use are contemplated.

It is intended that the scope of the invention be defined by the accompanying claims and their equivalents. While the foregoing has described and illustrated aspects of various embodiments of the present invention, those skilled in the art will recognize that alternative components and techniques, and/or combinations and permutations of the described components and techniques, can be substituted for, or added to, the embodiments described herein. All of the patents and publications referenced in this application are incorporated herein by reference in their entirety by reference.

What is claimed is:

1. A downhole system for measuring resistivity of a geological formation through a cased well, the system comprising:

means for detecting a first potential difference across a first region of the casing;

means for detecting a second potential difference across a second region of the casing; and regulating means for providing equilibrium between the first and the second potentials across the first and second regions respectively by regulating a first current injected into the casing above first region, a second current injected into the casing below the second region and a third current injected into the casing between the first and second regions.

2. A system of claim 1, further comprising a plurality of steerable current sources controlled by the processing means for injecting first, second and third currents in the respective regions of the casing.

3. A method for determining resistivity of a geological formation through a cased well, the method comprising steps of:
- injecting a first, a second and a third currents into a casing at vertically spaced apart points forming a first and a second regions between injection points;
- detecting a first and a second potential differences in the first and second regions; and
- regulating the first, second and third currents as to keep the first and second potential differences at equilibrium.

4. The method of claim 3, wherein the vertically spaced apart points are disposed at substantially equal intervals.

5. A method for programming a digital signal processor used in a downhole tool for measuring RTC of a geological formation, the method comprising steps of:
- (a) sampling at least two input waveforms from at least two analog-to-digital converters and preparing for the next sample/hold/conversion cycle done at least every 100 milliseconds;
- (b) performing phase-coherent detection of an operating frequency on all input waveforms;
- (c) average all readings over several seconds to decrease a noise bandwidth to fractions of 1 Hz;
- (d) adding currents a first and a second currents if the sum is at least about 1A, increasing targets for both currents, if more than about 1A, decreasing targets for both current;
- (e) detecting any imbalance between a first and second error voltages C–D and E–F. If |C–D|>|E–F|, raise current IA and lower current B. If |C–D|>|E–F|, lower current IA and raise current IB;
- (f) detecting any error voltage common to C–D and E–E. If the voltages indicate common-mode current flowing towards electrode M, raise the injection current at M. If there are common-mode currents flowing away from M, lower the current into M;
- (g) adding all corrective increments and decrements resulting from steps (d), (e) and (f) to compute net error values;
- (h) performing a PID algorithm for currents IA, IB, and IM to compute correction increments or decrements;
- (i) performing PWM algorithm for current switches feeding A, B, and M to compute on-or-off conditions for a next 100 $\mu$s time slot;
- (j) translating the measured currents IA, IB, and IM, into output readings;
- (k) translating the measured voltages VM into an output readings;
- (l) transmitting updated output readings, system status and error conditions; and
- (m) waiting to complete 100 milliseconds and repeat from the step (a).

6. An downhole system for measuring resistivity of a geologic formation through a casing wall, the system comprising:
- at least one measuring current injection electrode for injecting a measuring current in die casing wall, wherein a first section of the casing and a second section of the casing are on opposite sides of the at least one measuring current injection electrode;
- at least one first pair of measuring electrodes for detecting a first potential difference in the first section of the casing;
- at least one second pair of measuring electrodes for detecting a second potential difference in the second section of the casing;
- a first current injection electrode coupled to a position in the first section of the casing;
- a second current injection electrode coupled to a position in the second section of the casing;
- one or more processing units configured to adjust at least one of a first current that is injected into the casing via the first current injection electrode, a second current that is injected into the casing via the second current injection electrode, and the measuring current;
- wherein the one or more processing units (a) maintain the sum of the first and second currents constant, (b) increase the first current relative to the second current if the first potential difference is less than the second potential difference, (c) decrease first current relative to the second current if the first potential difference is greater than the second potential difference, (d) increase the measuring current if both the first and second potential differences indicate that at least a part of the first and second currents is flowing towards the measuring current injection electrode, and (e) decrease the measuring current if both the first and second potential differences indicate that at least a part of the measuring current is flowing towards each of the first current injection electrode and the second current injection electrode.

7. The system of claim 6, wherein the one or more processing units comprise a digital signal processor coupled to at least one analog-to-digital converter that digitizes one or more of the first potential difference and the second potential difference.

8. The system of claim 7, wherein the digital signal processor is coupled to one or more bi-directional steerable current sources to control at least one of the measuring current, die first current, and the second current and in accordance with a proportional-integral-derivative based procedure generating pulse-width modulation control signals to switch one or more of the bi-directional steerable current sources.

9. The system of claim 8, wherein measurements of each of the measuring current and a measuring voltage at the measuring current injection electrode are transmitted for computation of the formation resistivity.

10. A downhole logging system for measuring resistivity of a geological formation through a casing of a borehole, the system comprising:
- means for injecting at least two currents into the casing at a first point and a second point on the casing of the borehole;
- means for injecting at least one intermediate current into the casing at an intermediate point between the first and second points such that a the first section of the casing is between the first point and the at least one intermediate point and a second section of die casing is between the second point and the at least one intermediate point;
- means for detecting a first voltage difference within the first section of the casing to estimate current flow along the casing and a second voltage difference within the second section of the casing; end
- regulating means responsive to the first and second voltage differences and the at least two currents for regulating the at least two currents and at least one intermediate current to substantially eliminate current flow in the first section along the casing.

11. The downhole logging system of claim 10, further comprising means for computing an apparent resistivity of a section of the geologic formation proximal to the intermediate point as a function of a voltage difference measured between the intermediate point and a remote surface electrode and the at least one intermediate current.

12. The downhole logging system of claim 10, wherein the means for injecting the at least two currents and the at least one intermediate current into the casing comprise one or more switchable current sources.

13. The downhole logging system of claim 10, wherein the means for detecting the a first voltage difference comprise one or more differential amplifiers.

14. The downhole logging system of claim 13 wherein an output of one or more differential amplifiers is coupled to an input to one-or-more analog-to-digital converter (ADC).

15. The downhole logging system of claim 14, wherein the regulating means comprise a digital signal processor (DSP) connected to an output of the one or more ADC, wherein the DSP performs PIT) algorithm to determines magnitudes of changes to one or more of the at least two currents and the intermediate current to eliminate current flow along the casing in the first or second section of the casing.

16. The downhole logging system of claim 15, wherein the DSP is connected to the one or more bi-directional steerable cur ant sources whereby pulse-wave modulation (PWM) based switching of one or more bi-directional steerable current sources adjusts one or more of the intermediate current and the at least two currents.

17. A method for measuring resistivity of a geological formation traversed by a cased borehole, the method comprising:
injecting at least one current into a casing of the cased borehole at an injection point different from a measuring point where a time-varying measuring current is injected into the casing;
adjusting the at least one current in response to at least one first potential difference measured with at least one first electrode placed between the injection point and the measuring point and at least one second potential difference measured with at least one second electrode placed away from the injection point beyond the measuring point such that the at least one first potential difference is about zero whereby substantially eliminating flow of current along the casing between the injection point and the measuring point;
estimating at least one measuring voltage at the measuring point relative to a reference voltage;
estimating the measuring current and the at least one current; and
estimating an apparent resistivity of the geological formation from parameters comprising the measuring current and the measuring voltage.

18. The method of claim 17, further comprising injecting an additional current at an additional current injection point such that the one second electrode is placed between the additional current injection point and the measuring point.

19. The method of claim 18 further comprising adjusting the additional current in response to the at least one first potential difference and the at least one second potential difference such that the at least one second potential difference is about zero whereby substantially eliminating flow of current along the casing between the additional current injection point and the measuring point.

20. The method of claim 19, wherein the adjusting, in real-time, of one or more of the additional current, the measuring current, and the at least one current is in accordance with a proportional-integral-derivative control procedure generating a pulse-width modulation parameters to switch at least one bi-directional current source to substantially eliminate any current along the casing between the measuring point and the injection point.

21. The method of claim 20, wherein measuring point is symmetrically located between the injection point and the additional injection point.

22. The method of claim 21, wherein the magnitude of the sum of the at least one current and the additional current is substantially invariant.

23. The method of claim 22 further comprising averaging each of the at least one first potential difference and the at least one second potential difference over time to decrease their respective noise bandwidth to fractions of 1 Hz.

24. The method of claim 17, wherein the step of estimating is in accordance with a relationship given by $\rho_a = k \cdot \Delta z \cdot V_0 / I_M$, in which $\rho_a$ is the apparent formation resistivity, $V_0$ is the measuring voltage, $I_M$ is the measuring current, $\Delta$ is a length along the casing around the measuring point through which the measuring current is injected into the formation, and k is a form factor.

25. The method of claim 24 further comprising the step of computing an avenge formation resistivity in accordance with a relationship given $\rho_a = (2Q)^2/R$, in which $\rho_a$ is the average formation resistivity, R is an average casing resistance per meter for the material used in the casing, and Q is the characteristic impedance given by the relationship $Q = V_0/I_0$ with $I_0$ being the total current injected into the formation by various current injecting electrodes, and $V_0$ is the measuring voltage.

26. The method of claim 17, wherein a plurality of sub-electrodes are used to inject the measuring current.

27. The method of claim 17, wherein the at least one first potential difference and at least one second potential difference are measured symmetrically with respect to the measuring point.

28. The method of claim 17, wherein a distance between the at least one first electrode and the at least one second electrode is a resolution for measuring the apparent formation resistivity.

29. The method of claim 28 further comprising digitizing the at least one first potential difference and the at least one second potential difference with one or more analog to digital converters.

30. The meted of claim 29 further comprising processing the at least one first potential difference and the at least one second potential difference, following digitization, in a digital signal processor to adjust at least one of the at least one current, the additional current, and the measuring current.

31. The method of claim 30, wherein adjusting results in a zero-current zone about the injection point such that current along the casing in the zero-current zone is minimized.

32. The method of claim 30 further comprising specifying a target current such that adjusting by the digital signal processor results in a sum of the at least one current, the additional current, and the measuring current being the target current.

33. The method of claim 32 further comprising increasing the additional current relative to the at least one current in response to detecting that the at least one first potential difference is greater than the at least one second potential difference, and increasing the at least one current relative to the additional current in response to detecting that the at least one first potential difference is less than the at least one second potential difference.

34. The method of claim 33 further comprising increasing the measuring current in response to detecting that bath of the at least one first potential difference and the at least one second potential difference are driving currents along the casing toward the injection point, and decreasing the measuring current in response to detecting that both the at least one first potential difference and the at least one second potential difference are driving currents along the casing away from the injection point.

35. The method of claim 17, wherein one or more of the at least one first potential difference and the at least one second potential difference are averaged over time prior to estimation of the apparent formation resistivity by adjusting the measuring current, the at least one current, and to additional current.

36. A method for designing procedures and systems for continuous measurement of formation resistivity in a casing of a wellbore, the method comprising:

providing for injection of a measuring current into the casing of the wellbore at a first point;

providing for injection of at least one additional current at a second point, different from the first point, into the casing;

adjusting the measuring and the at least one additional current in real-time to substantially eliminate current flow between the first and the second points along the easing;

measuring a driving voltage relative to a reference for the casing at about the first point; and estimating the formation resistivity from the measuring current and the driving voltage.

37. The method of claim 36, wherein the casing has an axis defining current flow directions along the casing.

38. The method of claim 36, wherein the real-time adjustment of the measuring and the at least one additional currents is performed by feedback control of one or more bi-directional steerable current sources.

39. The method of claim 38, wherein the feedback is in accordance with a proportional integral derivative procedure to estimate changes in one or more currents in response to a voltage detected by the at least one measuring electrode pair.

40. The method of claim 36, wherein at least one measuring electrode pair detects flow of current along the casing between the first and the second points.

* * * * *